United States Patent [19]
Greene et al.

[11] Patent Number: 5,700,038
[45] Date of Patent: Dec. 23, 1997

[54] PIPE CONNECTION ASSEMBLY

[75] Inventors: Boyd Greene; Naji Nassif, both of Memphis, Tenn.

[73] Assignee: Gnesys, Inc., Memphis, Tenn.

[21] Appl. No.: 733,794

[22] Filed: Oct. 18, 1996

Related U.S. Application Data

[60] Provisional application No. 60/005,665 Oct. 18, 1995.

[51] Int. Cl.$^6$ .................................................. F16L 11/12
[52] U.S. Cl. .................. 285/54; 285/110; 285/174; 285/230; 285/231; 285/345; 285/374; 285/416; 285/906
[58] Field of Search ................................ 285/230, 231, 285/54, 173, 174, 286, 374, 345, 110, 416, 906

[56] References Cited

U.S. PATENT DOCUMENTS

| | | | |
|---|---|---|---|
| 2,451,070 | 10/1948 | Chamberlain | 285/230 X |
| 2,896,974 | 7/1959 | Bush | 285/230 X |
| 3,018,119 | 1/1962 | Champion | 285/54 X |

FOREIGN PATENT DOCUMENTS

| | | | |
|---|---|---|---|
| 2856450 | 4/1980 | Germany | 285/231 |
| 2208422 | 3/1989 | United Kingdom | 285/231 |

Primary Examiner—Dave W. Arola
Attorney, Agent, or Firm—Londa and Traub LLP

[57] ABSTRACT

A connector assembly is provided for connecting two pipes of dissimilar material. In particular, an assembly is provided for connecting a first end portion of a first pipe to a second end portion of a second pipe formed as a bell housing having a larger inside diameter than an outside diameter of the first end portion and which second end portion overlaps the first end portion. The connector assembly includes a mandrill for attachment to the first end portion, which is formed as a flange extending radially from an outside circumference of the first end portion to face at least a portion of an end face of the bell housing, and an axial tubular extension extending from the flange so as to, upon assembly, reach a point approximately equal to an axial end point of the first pipe, and reside within the second end portion creating an annular space therebetween. A sealing gasket, formed of an electrically insulating material, is formed as a base in the form of a tubular collar for residing fittingly around an outside circumference of the first end portion, and at least one annular fin projecting radially from an outside circumference of the base at an angle with respect thereto, said fin being rotatable inwardly about said angle towards the base and being biased outwardly about said angle, and said fin being substantially inflexible along its radial width.

11 Claims, 2 Drawing Sheets

5,700,038

1

PIPE CONNECTION ASSEMBLY

BACKGROUND OF THE INVENTION

The present invention relates to a device for connecting two pipes. In connecting two pipes of dissimilar material, for example steel to concrete (or clay or aluminum piping), a current may be formed at the point of contact, resulting in corrosion or degradation. Accordingly, the invention relates to a quick seal, self-locking dielectric arrangement, which is especially useful for connecting pipes of dissimilar material.

SUMMARY OF THE INVENTION

A connector assembly is provided for connecting a first end portion of a first pipe to a second end portion of a second pipe having a larger inside diameter than an outside diameter of the first end portion and which second end portion is in the form of a bell housing which overlaps the first end portion. The connector assembly comprises a mandrill attachable to the first end portion. The mandrill comprises a flange and a tubular extension, with the tubular extension being supportably connected to the first end portion, preferably by a radially extending ring. Preferably, an intermediate tubular ring is bonded to the tubular extension. A dielectric sealing gasket is then slipped over the intermediate ring. A further dielectric gasket is placed at an interface between the opposing faces of the flange and the bell housing of the second end portion and/or between opposing faces of the radially extending mandrill ring and and end face of the second end portion. Thus, all possible contact points between the two pipes are electrically insulated, so that where two pipes of dissimilar material are used, corrosion by way of a circuit can be avoided.

The sealing gasket comprises a base in the form of a tubular collar for residing fittingly around an outside circumference of the axial extension of the mandrill, or if present, the intermediate ring. At least one, and preferably a plurality of annular fins project radially from an outside circumference of the base, coaxially with the base, and at an angle with respect to the circumference of the base. The fin is rotatable inwardly about said angle towards the base against an outward bias, while being substantially inflexible along its radial width.

The fin projects at an acute angle α from the base, with a constant width A measured from the an inner circumference to an outer circumference of the fin along the body of the fin. A distance B measured radially perpendicular from the outer circumference of the base to the outer circumference of the fin decreases as a function of a decrease imparted to angle α. The angle α and distance B may be decreased upon radially inward pressure upon the fin, which occurs when the base, residing about a smaller diameter pipe end, is slid within the end of a larger diameter pipe end with the angle opening away from the second pipe end. The distance B of the uninstalled connector is chosen so as to be greater than the radial gap C between the outer circumference of the base and an inner circumference of the larger pipe end. Thus, the larger pipe acts to force the fin inward so as decrease angle α (and distance B) to correspond with the distance C, and to thereby grippingly retain the larger pipe end by way of the outer circumferential edge of the fin against axial movement in an opposite direction. The connector should be constructed of a suitable plastic or rubber which can allow for flexibility of the angled fin with respect to the base, while providing sufficient rigidity to the fin itself; furthermore, the connector, or at least the free edge of the fin, must be of a sufficiently frictional material to act as a gripping means, to provide frictional resistance against reverse axial movement along the inside circumferential surface of the larger pipe.

DETAILED DESCRIPTION OF THE INVENTION

Figure 1:
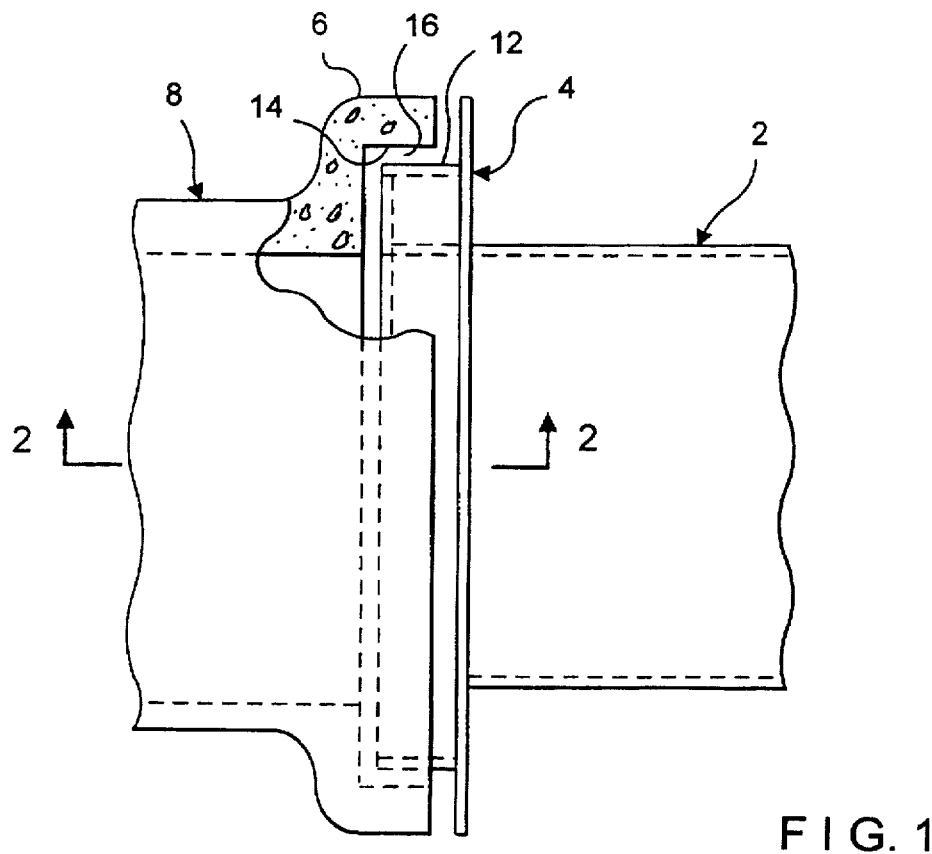
FIG. 1 is a schematic view of a male end of a pipe with a flange, situated within a female connecting of a second pipe.
Figure 2:
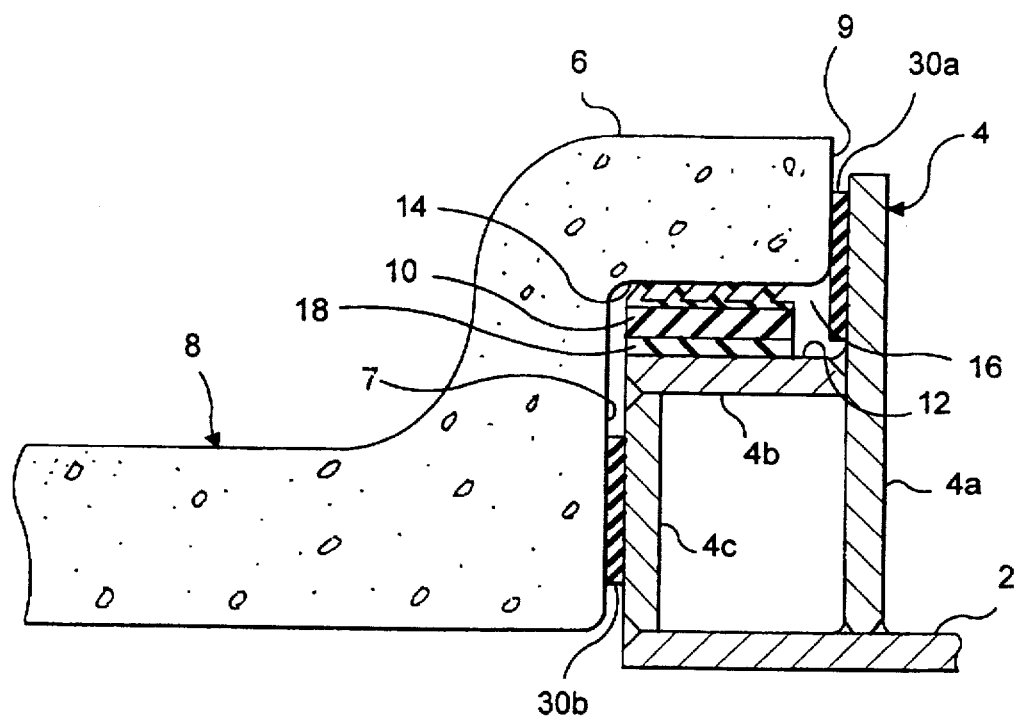
FIG. 2 is a cross-section taken along line II—II of FIG. 1.

FIG. 1 shows an end portion of a steel pipe 2 with a mandrill 4 welded thereto, situated as a male portion within the female end portion 6, formed as a bell housing, of a concrete pipe 8. There is a certain clearance in the shape of an annular space 16 between the outside diameter 12 of the mandrill 4 and the inside diameter 14 of the connecting portion 6 of the concrete pipe. Although a steel and concrete pipe are shown and discussed herein, the invention is applicable to dissimilar pipes of any material, and of course may be used with similar pipes as well.

The mandrill 4, preferably formed of metal, is formed to provide a flange 4a extending radially from the outer circumference of the pipe end portion 2, so as to face a substantial portion of the opposing face 9 of the bell housing 6. An axial tubular extension 4b sets out from the flange, so as to reside substantially within the length of the bell housing 6, and to leave an annular clearance space 16 between the outer circumference of the axial extension and the inner circumference of the bell housing. To provide additional support for the axial extension 4b, a radial extension 4c is preferably provided between axial extension and the outer circumference of the pipe 2. Thus, the mandrill 4 is comprised of the three parts 4a, 4b and 4c. The mandrill is fitted to the pipe 2 so that a constant flow line is maintained between the two pipes upon connection thereof, thus avoiding build-up of flow materials at the connection point.

It is crucial that no electrical conductance be permitted between the two dissimilar pipes. Therefore, the opposing outer faces of the mandrill and the inner faces of the bell housing must not touch, and preferably will have an insulating means therebetween. In order to insure non-conductivity between the two pipes, a gasket 30a is preferably provided interposed between the faces of the flange 4a and the end face 9 of the bell housing. Alternately, or in addition, thereto, a similar gasket 30b may be provided between the opposing faces of the radial support extension 4c and the end face 7 of the main portion of the concrete pipe.

A sealing gasket 10 of non-conductive material, preferably rubber, formed as a tubular base, is fit about the axial extension 4b, to sealingly and lockingly connect the two pipes. An intermediate ring 18, also of non-conductive material, may be optionally bound circumferentially about the axial extension, so that the sealing gasket may be slipped over the intermediate ring upon assembly.

Figure 3:
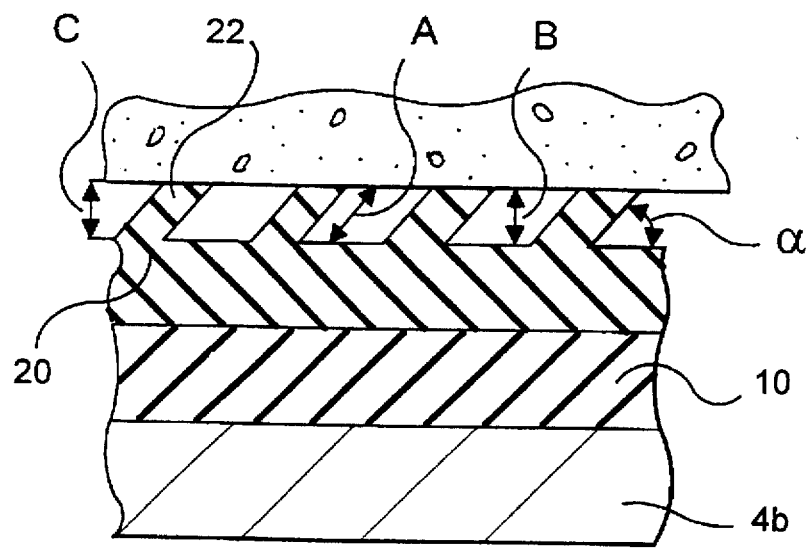
FIG. 3 is a schematic enlarged view of a portion of FIG. 2.

An enlarged detail of the sealing gasket in cross-section is shown in FIG. 3. A tubular base 20 is provided with at least one, and preferably a plurality of flexible fins 22 extending radially outward therefrom, forming a plurality of essentially parallel, angled rings extending from the base, preferably in coaxial orientation with the base. The fins 22 are formed on the base at an acute angle α, so that when the connector is properly installed, the angle α opens away from the connecting end face 7 of the concrete pipe.

The fins are also characterized by a fixed length A along the fin 22 from base to tip. A variable distance B is measured from the outside surface of the base along a perpendicular line to the tip of the fin. Because the fin forms an acute angle α with respect to the base, the distance B is shorter than the length A, which length A is effectively the hypotenuse with respect to the "side" B.

The connector assembly, and particularly the fins, is sized to allow entry of the steel pipe fitted with the assembly into the bell housing of concrete pipe to provide a seal. However, because of the unique structure of the fins, the connector is self-locking. Since the connection point, or more accurately connection circumference, between the base of the fins and the base (i.e. outside circumference) of the sealing gasket is slightly flexible, the fins may be rotated inwardly about the connection point so as to decrease the angle α, as the steel pipe with connection assembly fittingly enters the connecting area of the concrete pipe bell housing. However, once installed, the steel pipe and connector can not be withdrawn. The preferably rubber fins, which are biased rotatably outward, grip the inside of the concrete connecting portion. More importantly, however, angle α of the fins has resultingly been compressed to fit within the annular space at an angle α reduced from the uninstalled state, so that the distance B essentially coincides with the width C of the annular space. Any attempt to pull the steel pipe/connection assembly in the direction of withdrawal will require a decrease in the distance B, i.e. the effective diameter of the pipe/connection assembly must be decreased. However, because the length A is fixed, any movement in the withdrawal direction will provide a force trying to increase the angle α, and hence an increase in the distance B, caused by the gripping resistance of the fins against the inside of the concrete pipe. Since the distance B can not be increased once installed, this action results in the self-locking of the sealing gasket within the concrete pipe.

Those skilled in the art will appreciate that the fins must be constructed to provide sufficient rigidity and support, while also being able to provide sufficient resistance against withdrawal. Therefore, the thickness to length ratio of the fins will be an important consideration, and will be dependent on size of the gap between the pipes to be connected, as well as the properties of the particular connector material used. This ratio can be, for example, a maximum of 0.375 inches for a thickness of 0.190 inches, which would be useful for a concrete pipe of 24 inch inside diameter. If the fins were too long with respect to the thickness, there would be insufficient rigidity, and the fins could be forced to flex to allow withdrawal of the steel pipe.

Figure 4:
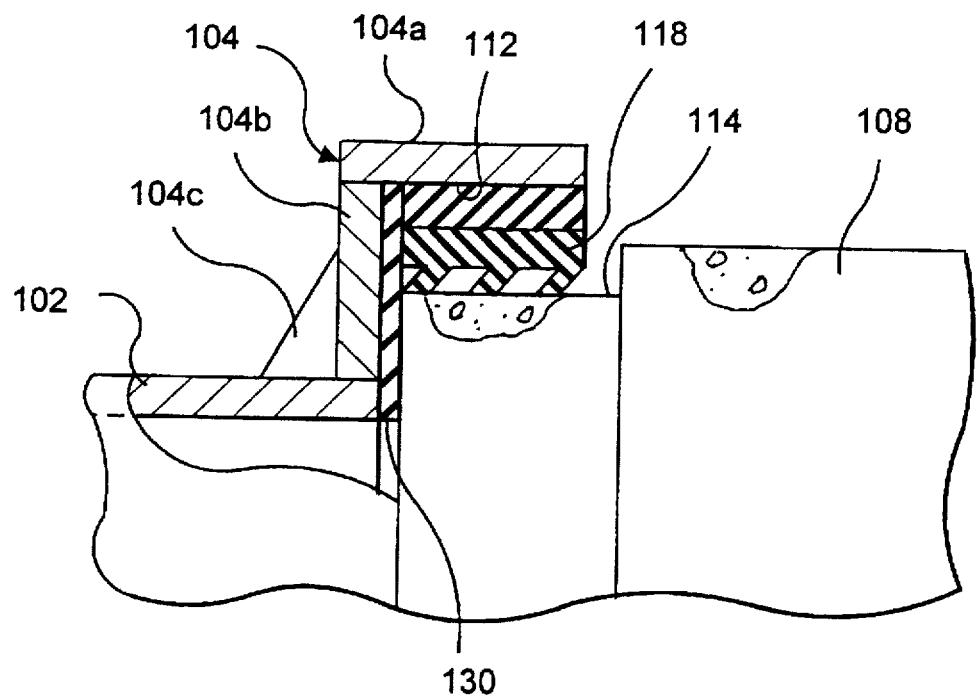
FIG. 4 is a schematic view of an alternate embodiment of the invention.

The invention may also be practiced with respect to alternate types of mating pipe ends. FIG. 4 shows an example of a concrete pipe 108 having a sloped outwardly oriented fitting end 114, in contrast to the inwardly oriented bell housing of the previous embodiment. In similar fashion, a mandrill 104 is assembled on the outer circumference of steel pipe 102, comprising a flange 104b and an axial extension 104b for surrounding the fitting end 114 with an annular space left therebetween. An optional 104c can also be provided to support the mandrill. A dielectric gasket 130 may also be provided. As above, the connection assembly is preferably constucted to provide unimpeded flow from one pipe to the next. The intermediate ring 112 and sealing gasket 118 operate as above. The principles set forth herein may be applied to any variations of pairs of pipe ends.

What is claimed is:

1. A connector assembly for connecting a first end portion of a first pipe to a second end portion of a second pipe, the connector assembly comprising a mandrill for attachment to the first end portion comprising
      a flange extending radially from an outside circumference of the first end portion to face at least a portion of an end face of the second end portion,
      an axial tubular extension extending from the flange toward the open end of the first end portion so as to, upon assembly, reach a point approximately equal to an axial end point of the first pipe, and axially overlap at least a portion the second end portion creating an annular space therebetween, and a sealing gasket, formed of an electrically insulating material, comprising
      a base in the form of a tubular collar for residing fittingly and circumferentially about the axial extension, and
      at least one annular fin projecting radially from the base at an angle with respect thereto, said fin being rotatable inwardly about said angle towards the base and being biased outwardly about said angle, and said fin being substantially inflexible along its radial width.

2. The assembly of claim 1, wherein the second end portion is formed as a bell housing having a larger inside diameter than an outside diameter of the first end portion and which second end portion overlaps the first end portion, wherein
   the sealing gasket is formed to reside around an outside circumference of the axial extension, and the at least one annular fin projects outwardly from an outside circumference of the base.

3. The assembly of claim 2, wherein the mandrill further comprises a radially extending support extending inwardly from the axial extension for fixation to the outside circumference of the pipe end.

4. The assembly of claim 2, further comprising a non-conductive ring for residing between opposing faces of the radially extending support and an end face of the second pipe.

5. The assembly of claim 1, wherein the sealing gasket is formed to reside around an inside circumference of the axial extension, and the at least one annular fin projects inwardly from an inside circumference of the base.

6. The assembly of claim 3, wherein the mandrill further comprises a support means extending from the flange for support against the first pipe.

7. The assembly of claim 1, further comprising a non-conductive ring for residing between opposing faces of the flange and an end face of the second end portion.

8. The assembly of claim 1, wherein the at least one fin and the base are coaxial.

9. The assembly of claim 1, comprising a plurality of coaxial spaced-apart fins.

10. The assembly of claim 1, wherein the at least one fin projects at an acute angle α from the base, with a constant width A measured from an inner circumference to an outer circumference of the fin along the body of the fin, and a distance B measured radially perpendicular from the outer circumference of the base to the outer circumference of the fin which distance B decreases as a function of a decrease imparted to angle α, and wherein the angle α and distance B may be decreased upon radially inward pressure upon the fin, whereby when the sealing gasket resides fittingly about the circumference of the first end portion, with the angle α opening away from the open end of the first pipe, and when the second end portion is slid axially in overlapping fashion with respect to the axial extension of the mandrill, the distance B of the uninstalled pipe and assembly combination being chosen so as to be greater than the radial gap C between the opposing circumferences of the base and second end portion, the second end portion acts to force the fin inward so as to decrease angle α to correspond with the distance C, and to thereby grippingly retain the second end portion by way of the outer circumferential edge of the fin against axial movement in an opposite direction.

11. The assembly of claim 1, further comprising an intermediate tube interposed between the axial extension of the flange and the sealing gasket.

* * * * *